Figure 1:
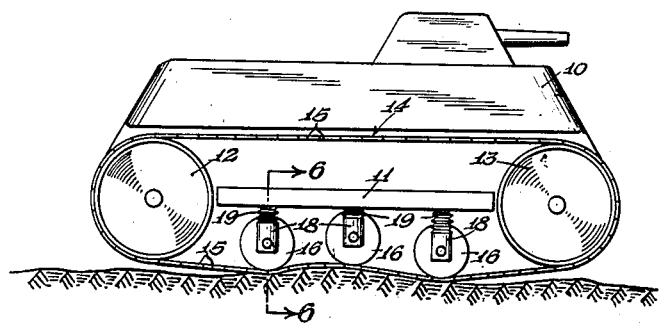

Aug. 10, 1943.                C. H. KÖHN                2,326,659
                        SPRINGY SUPPORTS OF TRACTORS
                    Filed July 30, 1940          2 Sheets-Sheet 1

INVENTOR.
CLAUS HINRICH KÖHN
BY
ATTORNEY.

Patented Aug. 10, 1943

2,326,659

UNITED STATES PATENT OFFICE 2,326,659

SPRINGY SUPPORT OF TRACTORS

Claus Hinrich Köhn, Rapperswil, St. Gallen, Switzerland, assignor to Karl Seiler, Zurich, Switzerland Application July 30, 1940, Serial No. 348,516
In Switzerland April 27, 1939

4 Claims. (Cl. 305—9)

This invention relates to tractors and similar machines.

Tractors and similar vehicles are usually driven and supported by endless belts the elements of which engaging the ground are in turn engaged from above by rollers supporting the body of the vehicle. Instead of endless belts a series of footplates is sometimes used which engages the surface of the ground and is attached to rollerchains running on tracks connected with or forming the frame of the vehicle and thus supporting it. In the first case the rollers are to be resiliently mounted on the frame, in the latter case the footplates are resiliently to be mounted on the rollers.

The resilient connections between the axles of the rollers and either the frame or the footplates caused considerable difficulties. Vehicles of this type are intended to pass not only over paved roads but also over graded, dusty and sometimes muddy ground. The springs therefore are to be protected against dust and dirt in order to secure their permanent operation, and to this end to be completely enclosed in a resilient cover. While with ordinary vehicles the springs are permanently under load, at least that of the vehicle, springs connected with footplates are under load only while the footplates engage the ground, but are non-loaded as soon as the footplates leave and are off the ground and idle. Rollers engaging endless belts are in permanent contact with the latter; however, the belt should not be pressed too far outward, particularly when it passes a groove in the ground or a ditch. A more or less complete release of the springs causes in any case undesirable vibrations and rattling, the former increasing the wear on the springy support and the latter disturbing the operator. It has been attempted therefore to limit the relative movement of the parts attached to the springs so that the latter are still kept under some tension when idle, and vibrations as well as rattling are reduced or avoided thereby.

It is an object of the invention to provide a simple and efficient structure for connecting the rollers with their support or a supported body which prevents dust and dirt from interfering with the expansion and contraction of the spring and simultaneously limits the expansion of the spring when it is off-load or idle.

It is another object of the invention to provide a resilient and dust- and dirt-proof casing for the spring which simultaneously connects it with the support or supported body and the rollers and also limits the expansion of the spring when off-load or idle.

It is a further object of the invention to provide a resilient and springy structure for connecting the rollers with the support or supported body which is dust- and dirt-proof and capable of limited expansion only.

It is still another object of the invention to provide a dirt- and dust-proof connection between the rollers and the support or supported body which is resilient in one direction and rigid in another direction, capable of limited expanison only.

Figure 2:
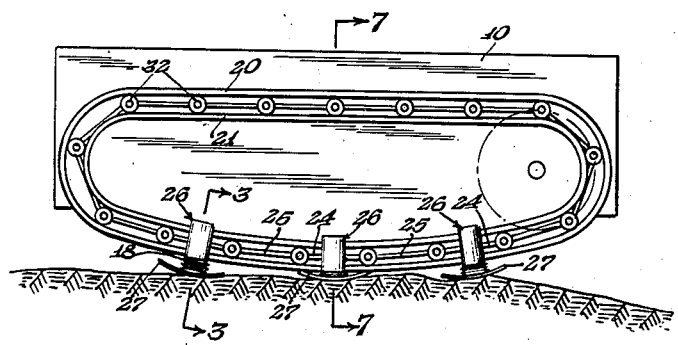
Figure 6:
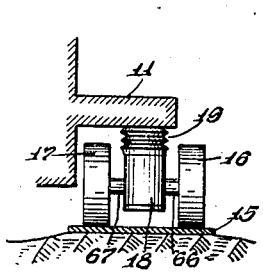
Figure 7:
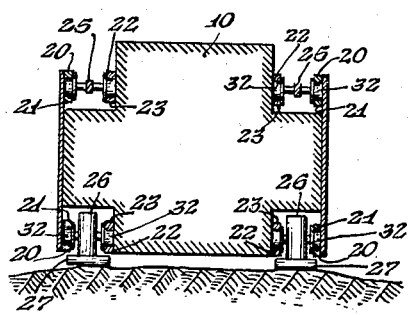
Figure 3:
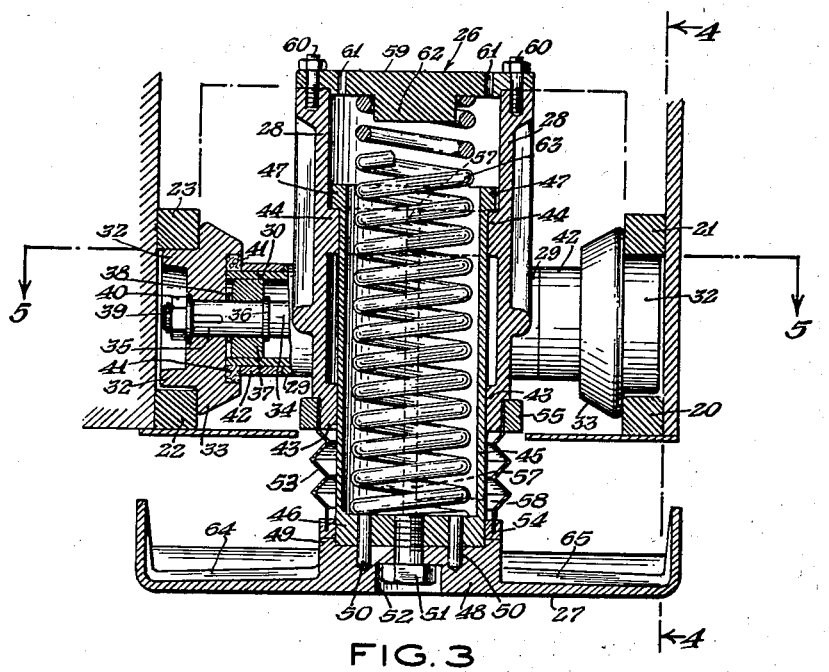
Figure 4:
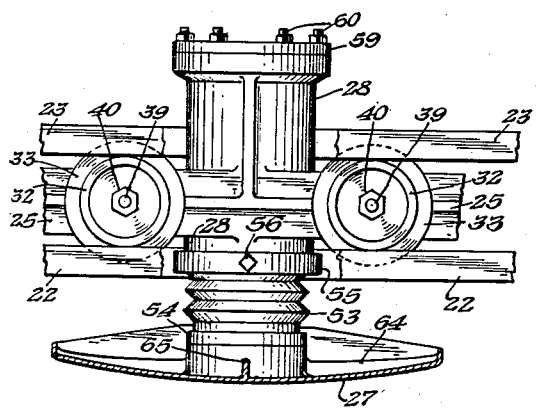
Figure 5:
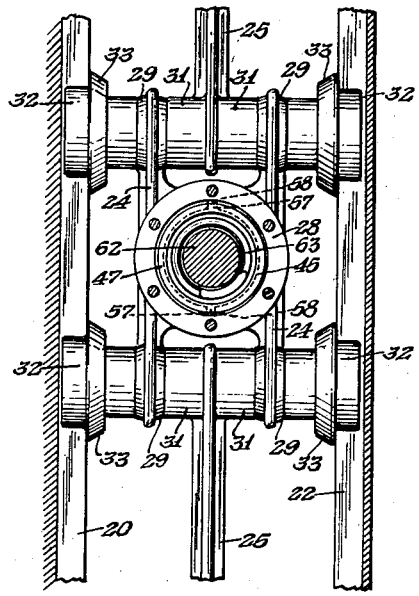

These and other objects of the invention will be more clearly understood as the specification proceeds with reference to the drawings in which Fig. 1 shows more diagrammatically a vehicle, such as a tank, provided with an embodiment of the invention, Fig. 2 more diagrammatically another embodiment of the invention applied to a tractor, Fig. 3 a cross section, partly in elevation, taken along line III—III in Fig. 2, Fig. 4 a side elevation, partly in section, along line IV—IV in Fig. 3, Fig. 5 a view along line V—V in Fig. 3, Fig. 6 a section, partly in elevation, taken along line VI—VI in Fig. 1, and Fig. 7 a side view in direction of arrow VII in Fig. 2.

Referring to the drawings, Figs. 1 and 6 show the body 10 of a vehicle, such as a tank, provided with a frame 11 in which pairs of guiding rolls or wheels 12, 13 are journalled; one pair of the rolls 12, 13 is driven by a motor, such as an internal combustion engine, as is well-known in the art and therefore not shown in detail in the drawings. Endless belts 14 suitably composed of short plates connected by joints run over the rolls 12, 13 and are taken along by the driven pair of rollers either through friction or by means of engaging tooth-like elements on the inside of belt 14 and the outside of the driving wheel, not shown either.

Plates 15 of belts 14 which just engage the ground are resiliently supported by pairs of rollers 16, 17, each pair being connected with frame 11 by means of a resilient structure 18, 19 to be described more in detail hereafter.

Referring to Figs. 2 and 7, the body 10 of a vehicle, such as a tractor, is provided with a frame structure comprising two runways for a rollerchain on each side. The runways consist of four rails 20, 21, 22, 23. On each runway a rollerchain runs which is composed of two alternating types of links 24 and 25, which will be described more in detail later on.

Links 24 are provided with a resilient mounting 26 for a footplate 27 adapted to engage the ground.

The two types of links 24 and 25 are to be seen in Figs. 4 and 5. Links 24 consist of a middle portion 28 forming a cylinder with bifurcated extensions on both sides ending in lugs 29 journalled on tube 30. Links 25 end in lugs 31 each fitting between a pair of lugs 29 of a bifurcated end of links 24 and are journalled on tube 30.

Rollers 32 provided with tyres or flanges 33 are slipped over the ends of tube 30. Bolt 34 provided with shoulders 36 is centered within tube 30 by rings 37. Ring-like washers 38 are slipped over the ends of the bolt in front of rings 37, and the rollers 32 are slipped over the ends of the bolt in front of the washers 38 and suitably keyed thereon. The projecting ends 39 of bolt 34 are reduced in diameter and screw-threaded, and nuts 40 screwed on to hold the rollers in place. 41 is a packing or the like arranged in a recess of flange 33 and spaced from lug 29 by ring 42 slipped over tube 30.

From this it appears that each joint of the link is formed by tube 30 as axle or pivot on which the lugs 29 and 31 are journalled and at the ends of which rollers 32 are fixedly attached and centered by means of rings 37 and bolt 34. Any other convenient structure of the axles and links for connecting them with the rollers 32 to form the joint may be provided. Lubrication of the joints, not essential for the invention, is not shown.

On the inside of cylinder 28 of each link 24 two rings 43, 44 are spacedly arranged serving as guiding means for another cylinder 45 closed on one end by and integral with a wall 46. On the outside of the other end of and connected with cylinder 45 a ring 47 is provided.

A footplate 27, of the shape shown or of any other desired shape, is provided with a projecting center portion 48 from which a ring 49 projects. The end of cylinder 45 with wall 46 snugly fits within ring 49. Studs 50 fitting in aligned holes of center portion 48 and wall 46 prevent relative rotation of these parts. Screw 51 inserted in a recess 52 of footplate 27 from the outside passes through a bore in the footplate and is screwed into a screw-threaded bore of wall 46. 64 and 65 are reinforcing ribs of the footplate.

A pleated collar 53 of leather or any other dust-proof fabric is fastened on one end in a ring 54 and on the other end slipped over the outside end of cylinder 28 and held in position by another slipped over ring 55; set-screws 56 fix ring 55 in position, while ring 54 is held in position by friction.

In order to prevent rotation of cylinder 45 relative to cylinder 28, the former is provided with ribs 57 on opposite sides engaging recesses 58 in rings 43 and 44.

A bottom 59 is fastened to the lower end of cylinder 28 by means of screws 60 and provided with holes 61 suitably covered by a fabric (not shown) permeable by air. Bottom 59 at the inside is provided with a projecting cylindrical center portion 62. A coil spring 63 is inserted into cylinder 45 and rests at one end of the inside of wall 46 and at the other end on bottom 59, and is held in position by the centerpiece 62.

When assembling the springy connection of the joint of the roller chain with the support or footplate 27, cylinder 28 is open and bottom 59 not yet attached thereto. Cylinder 45 is inserted into cylinder 28, Fig. 3, from below through the open end of the latter, thereupon spring 63 is inserted and bottom 59 attached to cylinder 28 by means of screws 60. Thereupon collar 53 is slipped over the upper end of cylinder 45 and ring 54 pressed over it to the place shown in Fig. 3. Now ring 55 is slipped over collar 53 and pressed into the position shown, and fixed by screws 56. Studs 50 are inserted into wall 46 and footplate 27 pressed into the position shown on top of cylinder 45, thereby engaging studs 50. Eventually, screw 51 is tightly screwed in.

It will be appreciated that the footplates 27 when engaging the ground more or less further compress spring 63, to meet the unevenness of the ground. Spring 63 expands as soon as the footplate runs off the ground. According to the invention rings 44 and 47 are provided which engage when spring 63 expands, and the lengths of the cooperating cylinders 28 and 45 as well as the spacing of rings 44, 47 are chosen so that the latter engage when spring 63 expands to a predetermined extent without being, however, completely released or untensioned. Thereby ring 47 is pressed with considerable force against ring 44 by spring 63 and movement of cylinder 45 relative to cylinder 28 is prevented when footplate 27 is off-load. Consequently undesirable vibrations and wear between the engaging cylinders as well as rattling are avoided.

It will be further appreciated that the resilient connection between the footplate 27 and the joint is dust- and dirt-proof, and the covers permeable by air for holes 61 permit the air enclosed in cylinders 28, 45 to escape when spring 63 is compressed and, vice versa, air to enter that space when spring 63 expands, but keeping out dust and dirt. Since the compression and expansion of air in cylinders 28, 45 is relatively small and in any case assists the resilient action of spring 63, holes 61 may be deleted, if desired.

In Figs. 1 and 6, 18 corresponds to cylinder 28, 19 to collar 53, and the pivots 66, 67 on which rollers 16, 17 revolve are directly attached to cylinder 28. The other reference numbers indicate similar parts as in Figs. 3 to 5.

From the above it will be appreciated that according to the invention a resilient connection comprised of the telescoping cylinders 28 (18), 45 and spring 63 arranged within them is provided between the rollers 16, 17 or 32 and a structure supporting the body of the vehicle. In the embodiment of the invention according to Figs. 1 and 6, the structure supporting the body is represented by frame 11, and in the embodiment according to Figs. 2 to 5 and 7 by footplate 27.

In both cases referred to above one of the telescoping cylinders, viz. 18 or 28, is rigidly attached to the axles 66, 67 or 30 of the rollers which engage in the embodiment of the invention according to Figs. 1 and 6 consecutive plates 15 of the endless belt and in the other embodiment the rails 20 through 23 of the frame structure. The other one of the telescoping cylinders, viz. 45, is rigidly connected in the first embodiment of the invention according to Figs. 1 and 6 with the supporting frame structure, and in the other embodiment of the invention with a supporting footplate 27.

In both embodiments of the invention the telescoping cylinders and spring enclosed by them resiliently transmit the weight of the body of the vehicle to the elements engaging the ground, viz. the foot plates 27 or the plates 15 of the endless belt.

With both embodiments of the invention the cooperating rings or abutments 44, 47 when engaging upon predetermined relative movement of the telescoping cylinders and expansion of the spring, prevent vibration and wear as well as rattling, and in any event prevent complete separation of the telescoping cylinders.

In the first embodiment according to Figs. 1 and 6, an undue release of the spring can occur when the endless belt just engaged by a roller passes a hole or ditch and thereby runs off the ground; would the spring be permitted to expand completely, the belt would be unduly strained and vibrations might set in. With the other embodiment of the invention, undue release of the spring can occur when the footplate runs off the ground and is idle. Due to centrifugal forces, the footplate could also draw cylinder 45 out of cylinder 28.

It is to be understood that the invention is not limited to the exemplifications explained above with reference to the drawings but to be derived in its broadest aspect from the appended claims.

What I claim is:

1. A vehicle, such as a tractor comprising, in combination, a supporting frame provided with tracks forming closed paths in substantially vertical planes, roller chains each substantially composed of two alternating types of links connected by joints, each joint comprising an axle and rollers on both ends of the axle, each roller engaging one of said tracks; one type of said links comprising a first cylinder coaxial with a substantially vertical plane and open towards the outside of said vehicle and the ground in corresponding positions, a second cylinder slidably arranged in said first cylinder and projecting to the outside of said vehicle, means for closing the inside end of said first cylinder, means for closing the outside end of said second cylinder and a footplate attached thereto, tensioned resilient means as exemplified by a compressed spring arranged within said telescoping first and second cylinders and engaging their closed ends, and a ring-like abutment on the inside of said first and another ring-like abutment on the outside and near to the inner end of said second cylinder, said abutments arranged to be spaced from each other when said resilient means are under load and said cylinders slide deeper into each other and to engage each other when said resilient means expand offload to a predetermined extent but still are tensioned; the other type of said links being journaled on and connecting a pair of adjacent axles.

2. In combination with a vehicle, such as a tractor, the weight of the body of which is translated through rollers and resilient structures upon supporting and propagating foot plates, said resilient structures comprising a pair of telescoping tubular elements closed on opposite ends and engaging one another in two axially distant circumferential areas the distance of which is substantial and the same in all the relative positions of said elements, tensioned resilient means as exemplified by a compressed spring arranged within said tubular elements and engaging said closed ends, abutments of said elements arranged to cooperate in limiting the relative motion of said elements under action of said resilient means when off-load, one of said abutments also forming one of said areas, rigid means including axles for rollers attached to the outer one of said elements, and rigid means connected with the inner one of said elements for connecting it with a footplate.

3. A resilient structure for translating the weight of the body of a vehicle, such as a tractor, upon supporting and propagating means, comprising two telescoping tubular elements closed on opposite ends, an inwardly projecting slideway on the outer of said elements engaging the inner element over a substantial length of its axial extension the same in all the relative portions of said elements, tensioned resilient means as exemplified by a compressed spring arranged within and associated with said tubular elements so as to force them relative to one another in opposite directions, an outwardly projecting substantially circular abutment on the inner one of said elements and arranged to cooperate with an edge of said slideway in limiting the relative motion of said elements in said opposite directions, and rigid means including axles for rollers attached to the outside of the outer of said elements so that a plane vertical to the longitudinal axis of said tubular means and through said axles cuts said slideway.

4. In combination with a vehicle, such as a tractor, provided with driving means including supporting structures, such as footplates, consecutively and recurrently engaging the ground, with a frame of the body of said vehicle, and with rollers securing movement of said driving means relative to said body in predetermined path: a resilient structure comprising two tubular elements, one slidable in the other and closed on opposite ends, one of said elements provided with a projecting slideway engaging the other element over a substantial length of its axial extension the same in all relative positions of said elements; tensioned resilient means, as exemplified by a compressed spring, arranged within said tubular elements and engaging said closed ends; an outside projecting ring near the inner end of the inner of said tubular elements, a substantially circular projection on the inside of the outer of said tubular elements, said ring and projection arranged to be spaced from each other when said resilient means are under load and said elements have slid deeper into each other and to engage each other upon predetermined expansion of said resilient means when off-load but still tensioned; a flexible dust-proof collar arranged between the open end of the outer of said elements and the projecting portion of said inner element; a structure rigidly connected with one of said elements for rotatably connecting a roller therewith; and means for rigidly connecting the other of said elements with said supporting structures.

CLAUS HINRICH KÖHN.